(12) United States Patent
Beres et al.

(10) Patent No.: US 7,324,998 B2
(45) Date of Patent: Jan. 29, 2008

(54) DOCUMENT SEARCH METHODS AND SYSTEMS

(75) Inventors: Timothy E. Beres, Boulder, CO (US); Michael W. Diesch, Battle Creek, MI (US); Bradford L. Hayes, Louisville, CO (US)

(73) Assignee: ZD Acquisition, LLC, Santa Ana, CA (US)

( * ) Notice: Subject to any disclaimer, the term of this patent is extended or adjusted under 35 U.S.C. 154(b) by 506 days.

(21) Appl. No.: 10/804,468

(22) Filed: Mar. 18, 2004

(65) Prior Publication Data

US 2005/0210007 A1 Sep. 22, 2005

(51) Int. Cl.
G06F 7/00 (2006.01)

(52) U.S. Cl. .................. 707/10; 707/3; 707/5

(58) Field of Classification Search ........... 707/1–3, 707/5, 10
See application file for complete search history.

(56) References Cited

U.S. PATENT DOCUMENTS

| | | | |
|---|---|---|---|
| 4,635,136 | A | 1/1987 | Ciampa et al. |
| 6,237,011 | B1 | 5/2001 | Ferguson et al. |
| 6,810,404 | B1 | 10/2004 | Ferguson et al. |
| 6,829,601 | B2 | 12/2004 | Honda et al. |
| 2002/0032693 | A1 | 3/2002 | Chiou |
| 2002/0035535 | A1 | 3/2002 | Brock, Sr. |
| 2002/0065739 | A1* | 5/2002 | Florance et al. ............... 705/26 |
| 2003/0036922 | A1 | 2/2003 | Fries |
| 2003/0140064 | A1 | 7/2003 | Klein |
| 2003/0187849 | A1 | 10/2003 | Ruby |
| 2004/0030741 | A1* | 2/2004 | Wolton et al. ............... 709/202 |
| 2004/0044696 | A1 | 3/2004 | Frost |
| 2004/0128232 | A1 | 7/2004 | Descloux |
| 2004/0243921 | A1 | 12/2004 | Carr |
| 2005/0060203 | A1 | 3/2005 | LaJoie |
| 2005/0060284 | A1 | 3/2005 | Ruby |
| 2006/0265350 | A1* | 11/2006 | Klein ........................... 707/1 |

* cited by examiner

Primary Examiner—Wilson Lee
Assistant Examiner—Michael Le
(74) Attorney, Agent, or Firm—Townsend and Townsend and Crew LLP (57) ABSTRACT

Methods and systems are disclosed for retrieving records. In one embodiment, the method comprises obtaining a starting record from a data set, obtaining a value associated with a first attribute of the starting record and executing at least one search for additional records in the data set associated with the value. The additional records are added to a result set. One of the records in the result set is selected and a value associated with a second attribute of the record is obtained. A second search for second additional records in the data set associated with the second value is executed. The second additional records are added to the result set. The records in the result set are outputted.

17 Claims, 8 Drawing Sheets

DOCUMENT SEARCH METHODS AND SYSTEMS

CROSS-REFERENCES TO RELATED APPLICATIONS

This application is related to the following co-pending, commonly-assigned and concurrently filed U.S. Patent Applications, the entirety of incorporated by reference for all purposes: Provisional U.S. Patent Application No. 60/554,511, entitled "PROPERTY RECORDS DATABASES AND SYSTEMS AND METHODS FOR BUILDING AND MAINTAINING THEM"; U.S. patent application Ser. No. 10/804,472, entitled "AUTOMATED RECORD SEARCHING AND OUTPUT GENERATION RELATED THERETO"; U.S. patent application Ser. No. 10/804,467, entitled "DOCUMENT ORGANIZATION AND FORMATTING FOR DISPLAY"; Provisional U.S. Patent Application No. 60/554,514, "CONFIDENCE-BASED NATURAL LANGUAGE PARSING" and Provisional U.S. Patent Application No. 60/554,513, entitled "CONTEXTUAL CONVERSION OF LANGUAGE TO DATA".

BACKGROUND OF THE INVENTION

Title searches are typically performed on documents recorded with a government entity before a sale or refinance of a property. These title searches are used by a title insurer to determine whether to issue a title insurance policy, the exclusions to apply to the policy, and/or the premium to be paid for the policy. The title searches retrieve documents that may be relevant to the property under examination. These documents may include mortgages, prior conveyances, recorded liens, release of liens, release of mortgages, and other types of documents recorded with a government entity.

Historically, title searches have been performed by a physical visit to the records department of the government entity in which the property is situated. Even when the information is available in electronic format, the data obtained from the government entities will likely contain a number of inaccuracies (typographical errors in names, addresses, locations, etc.) and missing information. Because of these inaccuracies, standard search techniques may not retrieve all of the documents needed to perform an accurate title examination.

BRIEF SUMMARY OF THE INVENTION

Methods and systems are disclosed for retrieving records. In one embodiment, the method comprises obtaining a starting record from a data set and obtaining a value associated with a first attribute of the starting record. At least one search is executed for additional records in the data set associated with the value. The additional records are added to a result set. One of the records in the result set is selected and a value associated with a second attribute of the record is obtained. A second search for second additional records in the data set associated with the second value is executed and the second additional records are added to the result set. The records in the result set are outputted.

In one embodiment, the starting record is included in a first subset of records in the data set. The first attribute is a reference to a record in a second subset of records in the data set. The value used to execute the at least one search is obtained from the record in the second subset using the reference.

A variety of search types may be performed during the execution of a search. For instance, a search for the exact value of the attribute may be performed. Alternately, or additionally, a fuzzy logic search may be performed.

Additional searches for records to be added to the result set may also be performed using attributes from the starting record. Thus, the method may also include obtaining a third value associated with a second attribute of the starting record. At least one search for third additional records in the data set associated with the third value may be executed. The third additional records are be added to the result set.

The method may additionally include performing a verification on one or more records in the result set. The verification is performed using at least one criteria. Records that do not meet the criteria may be removed from the result set. After the records are removed from the result set, the remaining records in the result set may be returned.

In a second embodiment, the method may be used to retrieve documents for a title examination. The method operates on a data set having a first subset of records associated with documents recorded with a government entity. The method comprises obtaining a starting record from the first subset. The starting record is associated with one or more of one or more names, one or more location values, one or more referenced documents, a parcel identification, and an address. A first search for additional records in the first subset associated with at least one of the attribute values is executed. The additional records are added to a result set. One of the records in the result set is selected; the selected record is associated with a second set of attribute values. A second attribute value from the second set is used to execute a second search for second additional records in the first subset associated with the second attribute value. The second additional records are added to the result set and the records in the result set are outputted.

The first search may be performed in a variety of ways. For example, the search may be executed using a parcel identification value associated with the starting record, records referencing the starting record, records referred to by the starting document, and/or names associated with the starting record.

As a second example, one or more location values associated with the starting record location values may also be obtained and used to execute the first search. For instance, the location values may comprise a subdivision value, a lot value, a block value, and a tract value. The search may be performed to find records in the first subset associated with all of the location values. Alternately, the search may be performed to find records in the first subset matching the subdivision value and either the block value or the track value. Other combinations may also be used to perform the first search using the location values associated with the starting record.

A verification may be performed on one or more of the records in the result set using at least one criteria. Records that do not satisfy the criteria are removed from the result set. A variety of criteria may be used to perform the verification. For instance, if the record was added to the result set by the second search (the name search), an address associated with the record is compared to an input address and the record is removed from the result set if the address differs from the input address. As a second example, a parcel identification associated with the record may be compared to an input parcel identification and the record may be removed from the result set if the parcel identification differs from the input parcel identification.

Records referred to by the document being verified may also be used to verify the record. A reference record associated with the document referenced by the record is obtained. One or more values associated with the reference record are compared to one or more input values. The record is removed from the result set if the values associated with the reference record differ from the input values.

In a third embodiment, the method comprises obtaining a starting record a first subset of records associated with documents recorded with a government entity. The starting record is associated with a name and one or more location values indication a location of a property. A first search for additional records in the first subset associated with at least one of the location values is executed. The additional records are added to a result set. Additionally, a second search for second additional records in the first subset associated with the name is executed. The second additional records are also added to the result set. The records in the result set are outputted.

The method may additionally include selecting one of the records in the result set. The selected record is associated with a set of attribute values including one or more of one or more names, one or more location values, one or more referenced documents, a parcel identification, and an address. At least one of the attribute values is used to execute a third search for third additional records associated with the attribute value. The third additional records are added to the result set.

The methods may be embodied in a system comprising a data set and logic communicatively coupled to the data set. The logic is used to perform the method. In some embodiments, the system may further include a user interface to receive one or more input values from a user. The user interface may alternately or additionally be used to display records in the result set.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Although concrete embodiments will be described with reference to retrieving records for a title examination, the methods and systems described herein may be used in other types of applications. By way of example, the methods and systems may be used to retrieve genealogy records. Other uses are also contemplated.

Figure 1:
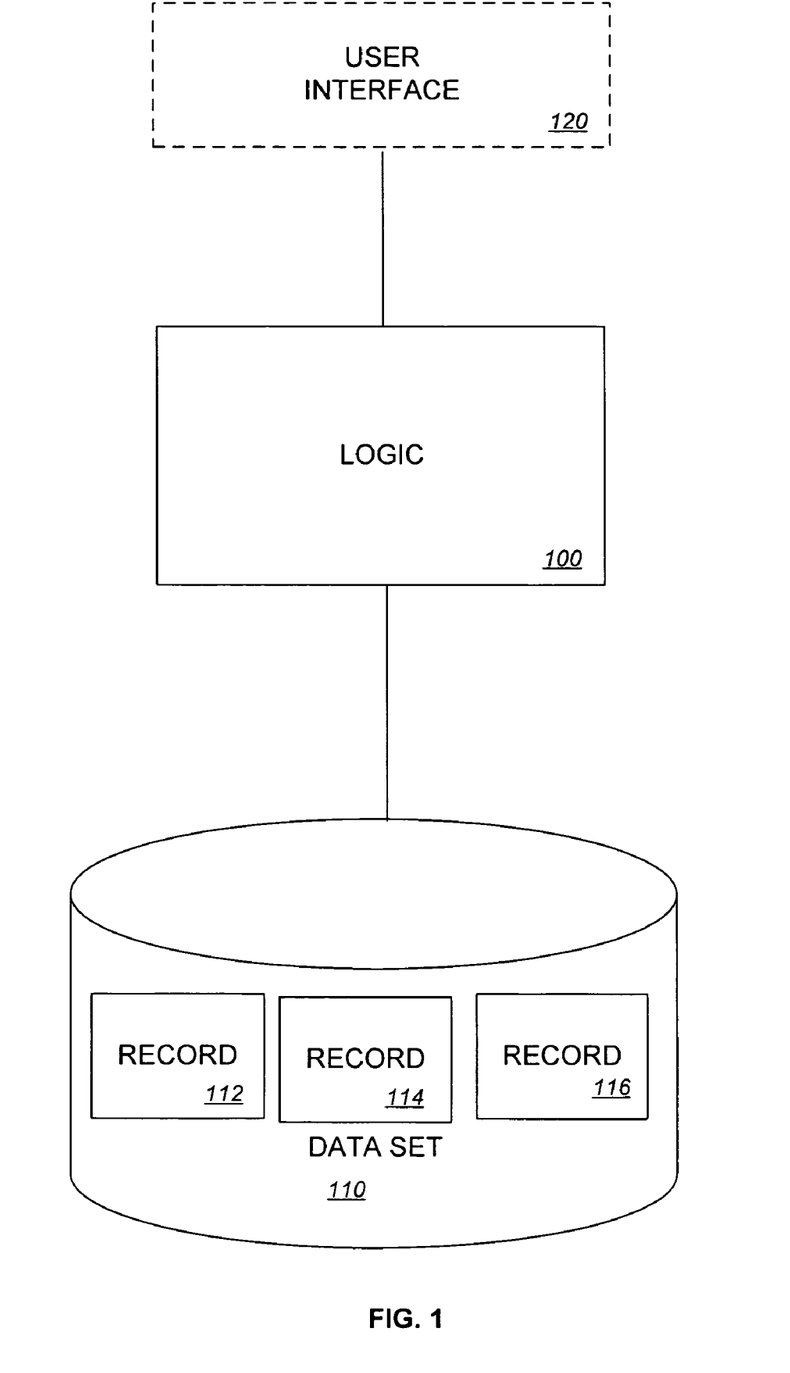
FIG. 1 illustrates an exemplary embodiment of a system that may be used to retrieve records.

FIG. 1 illustrates an exemplary embodiment of a system that may be used to retrieve records. The system includes a data set 110 containing one or more records 112, 114. Data set 110 may be any type of data set having attribute values. By way of example, data set 110 may be a relational database with one or more tables, a spreadsheet, or one or more text documents.

The data set is communicatively coupled to logic 100. By way of example, logic 100 may be program code residing on a computer readable medium. Logic may also be embodied in firmware or a combination of firmware and software. As will be described in further detail below, logic 100 may be used to search for records in the data set 110 based on one or more values in a starting record. In some embodiments, values from records retrieved by the search may also be used to perform additional searches for records.

Logic 100 may optionally be communicatively coupled to user interface 120. User interface 120 may be any type of interface, such as an Internet browser or other type of graphical user interface (GUI). A user may enter search parameters using user interface 120. These parameters may be used to define the scope of searches performed on data set 110. User interface 120 may also be used to obtain input values that are used by logic 100 to define one or more searches and/or used to verify documents that are retrieved.

In one embodiment, logic 100 is used to retrieve records associated with documents recorded with a government entity for a title examination. In this embodiment, data set 110 may include information obtained from recorded documents. The recorded documents may be obtained from a plurality of government entities. Each document may include a variety of information. As one example, a document may include a government identifier (e.g., a reception number, an instrument number, a volume/book/page number), a document date, a recordation date, a Mortgage Electronic Registration (MERS) number, a Torrens title number, address data, parcel identification data, location data, one or more names (owner, seller, lien claimant, etc.), and one or more references to previously recorded documents (e.g., previous reception/instrument number). The location data could include one or more of meridian, range, township, section, subsection, lot, block, tract, subdivision, parcel number, or other types of data describing location. Further details of the information contained on a recorded document may be found in previously incorporated application Ser. No. 60/554,511. It should be appreciated that recorded documents may contact additional or alternate information from that described above.

The information obtained from recorded documents may be stored in a relational database with a plurality of tables. The tables may include normalized document meta-data for each document (e.g., document id, recordation date, government identifier, document date, document type), normalized location data (e.g., subdivision identification, block, lot, tract), normalized name data for names referred to by documents and the role associated with the name for the document (e.g., seller, buyer, lien holder, etc.), normalized address data, normalized parcel identification data, and/or normalized document reference data linking two documents. It should be appreciated that data set 110 may include additional information related to documents recorded with government entities as described more fully in application Ser. No. 60/554,511, previously incorporated by reference.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that logic 130, data set 110, and user interface 120 may reside on the same or different physical devices. By way of example, user interface 120 may be a web browser on a remote client.

Figure 2:
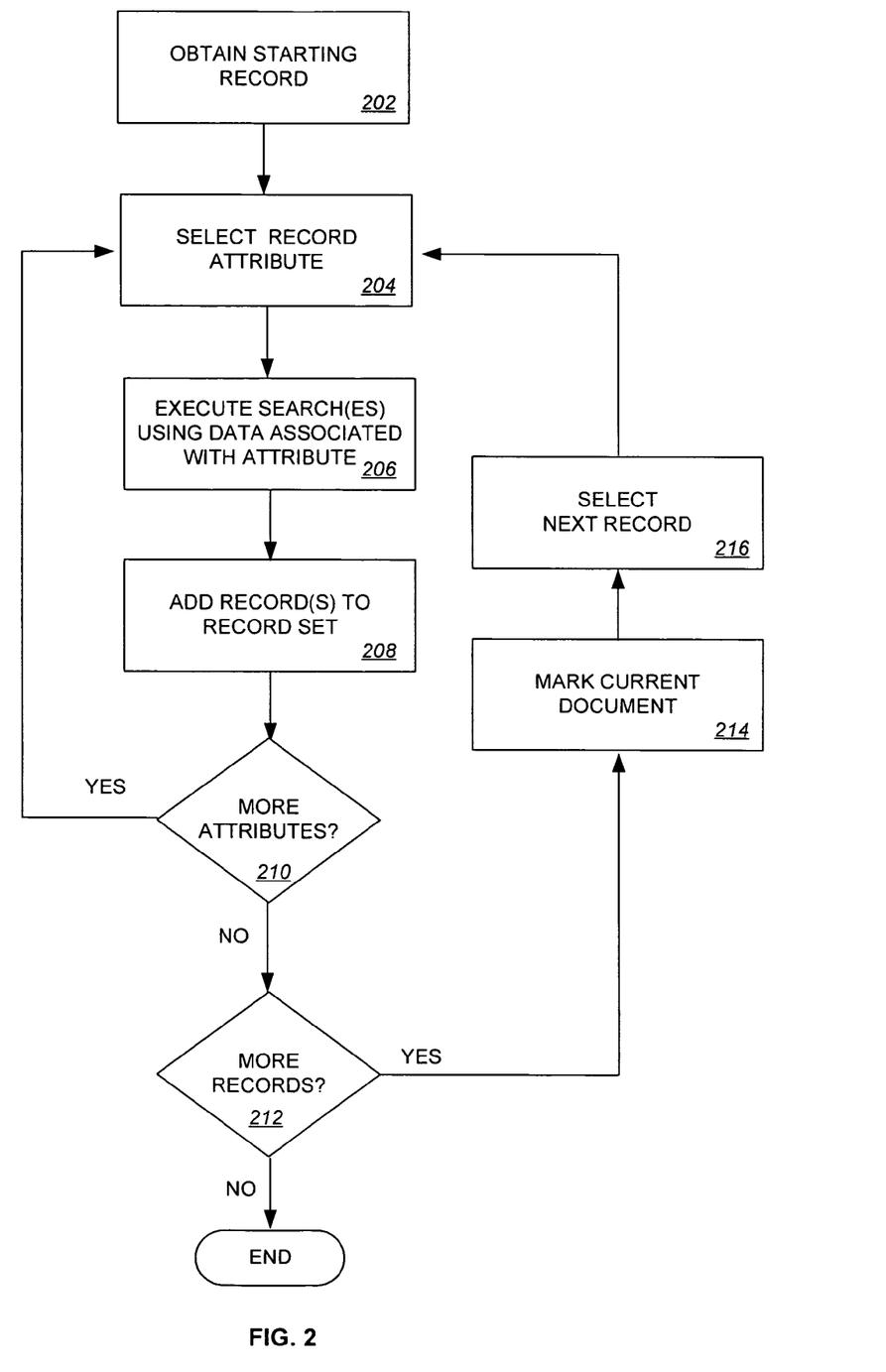
FIG. 2 is a flow diagram of an exemplary method for retrieving records.

FIG. 2 illustrates a exemplary embodiment of a method that may be used to retrieve records. A starting record is obtained 202 from the data set 110. The starting record has a number of attributes associated with it. For instance, a record for a recorded document may have a location attribute. One of the attributes is selected 204 to be used to search for other records.

One or more searches are then executed 204 using data associated with the selected attribute. It should be appreciated that the data value associated with the attribute may be obtained from the starting record or may be obtained from a second record referenced by the first attribute. For instance, in a normalized data set of recorded documents, a master record in a first subset of data (e.g., a database table) may store information for a recorded document. The master record may include a location attribute referencing a plurality of values stored in a second subset of data (e.g., a second table). The values in the second table for a specified location may include a subdivision value, a block value, a lot value, a tract value, survey information, and other location information for a property. Thus, a search may be executed 204 using either the value of the location attribute stored in the master record and/or one or more of the values in the second table associated with the master record. Additional searches may also be executed 204 for a different combination of the values.

A variety of search types may be used to execute 206 the search(es). As one example, a search for records having an exact match of the data value associated with the attribute may be performed. As a second example, a fuzzy logic search for records approximately matching the value may also be used. A fuzzy logic search is a type of search that may be used to retrieve records that approximately match the search value. For instance, a fuzzy logic search may be performed to search for a text value and variations of the text value (e.g., a subdivision or name associated with a recorded document). This may allow the retrieval of records with typographical errors. In one embodiment, a user may enter a search parameter specifying a desired accuracy of the match, such as a percentage the value associated with retrieved records should match the search value. The desired accuracy may also have a default value. In other embodiments, the desired accuracy may not be user configurable. It should be appreciated that other search types know in the art may also be used.

Records associated with the value(s) used to execute one or more of the searches are added 208 to a result set. It should be understood by those skilled in the art that the records added to the result set may not directly include the search value(s). As previously described, in some embodiments a search may be performed on value(s) obtained from a record in a second subset of data referred to by a starting record in a first subset of data. The value(s) from the second record may be used in instances where searches other than exact match to the value in the starting record is performed. For example, the starting record may have a reference value to a name record in a name table. The name value may be retrieved from the name table and used to perform a fuzzy logic search. In those embodiments, corresponding records in the first subset of data that refer to the records matched by the search may be added 208 to the result set.

At 210, a determination 210 is made as to whether there are more attributes associated with the starting record that should be searched. The attribute values for which one or more searches are executed 206 may be a predetermined list of attributes or a user-specified list of attributes. All attributes associated with starting record may not be used in a search. If there are more attributes associated with the starting record for which a search is to be performed, the method returns to 204 where a second attribute from the starting record is selected.

After all the desired attributes associated with the starting record have been searched, a determination 212 is made as to whether there are other records that have attribute values to be searched. The other records are selected from the result set. Thus, after a record has been added 208 to the result set, it is used to perform additional searches with values associated with its attributes. This may provide a fault tolerant and redundant method for retrieving records that logically relate to the master record. In some embodiments, a reference may also be associated with the records in the result set indicating the attribute values and/or the record associated with the attribute values used in the search that retrieved the record.

If there are no more records to be processed, the method ends. The records that are in the result set may be output for additional processing or may be displayed to a user. As will be described in further detail below, further processing may be done to verify that records belong in the result set before being outputted.

If there are additional records to be processed, the current record may be marked 214 with an indication that the record has been processed. This may keep the record from being processed more than once. The record may be marked 214 at any point in time after the record has selected for processing. A next record in the result set is then selected 216. The record may be selected 216 from the remaining records in the result set that have not been processed (e.g., marked with an indication the record was processed). The method then continues at 204 where an attribute of the next record is selected.

Variations of the method described in FIG. 2 are contemplated. For instance, in alternate embodiments, a starting record may not be obtained 202. Instead, one or more values may be obtained from a user or other source and used to execute searches for records matching the input values.

The method described in FIG. 2 may be used to retrieve documents for a title examination. Thus, in some embodiments, a first subset of records in data set 110 may be associated with documents recorded by a government entity. A variety of searches may be performed using attribute values obtained from a starting record in the first subset. The starting record may be obtained 202 from a user. Alternately, some or a portion of the initial attribute values may be obtained by user specified input values. Additional records in the first subset retrieved by the searches are then processed with the same applicable searches. At the completion of the searches, the result set may include records associated with a set of recorded documents that may be used to generate a title abstract or title policy.

Figure 3:
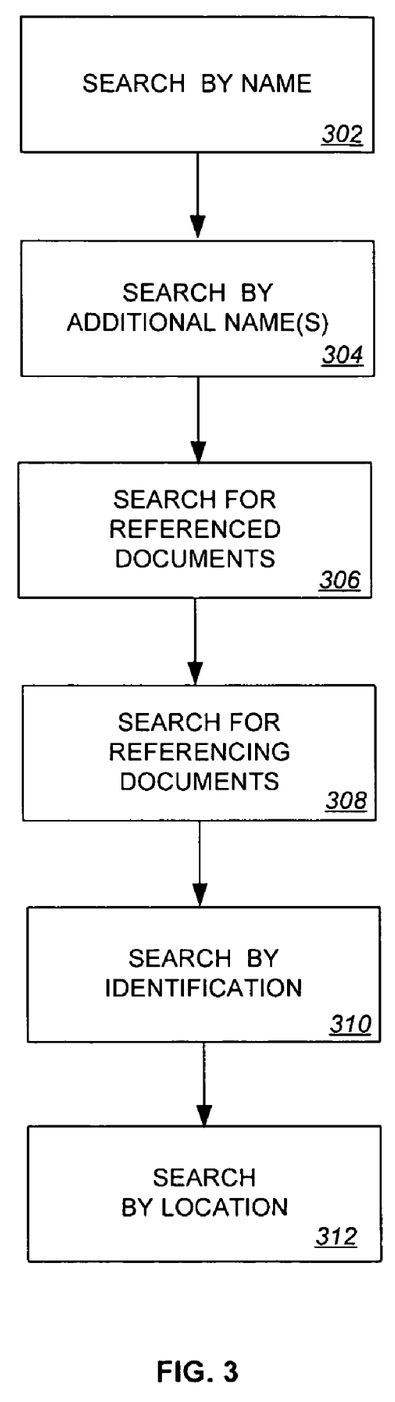
FIG. 3 is a flow diagram of an exemplary method that may be used to retrieve documents for a title examination.

FIG. 3 illustrates an exemplary method of searching for related records that may be used to process the starting record and each record added to the result set. The records may be associated with a set of attribute values including one or more of one or more names, one or more location values, one or more referenced documents, a parcel identification, and an address. Additional attributes may also be associated with the records. Each record that is to be processed may not include all of the attribute values used to execute the searches described below. Thus, some of the searches may not be applied to one or more of the records processed. Additionally, as previously described, one or more search types (e.g., exact match, fuzzy logic) may be used to execute each search.

After a record has been selected to be processed, a name value associated with the current record may be obtained and used to search 302 for recorded documents associated with the name value. By way of example, the name value may be the current owner of the property under examination. The name value may be obtained from a record in a second set of data associated with the current record. Records from the first subset of data for recorded documents associated with the name value are added to the result set 208. Additional name values associated with the current record may also be used to search 304 for recorded documents. Name variations for names that were previously searched may also be collected and used to search for recorded documents. As will be described below with reference to FIG. 5, not all name values associated with the current record may searched. Additionally, before a name value is used in a search, an excluded name list may be checked to determine if the name is on an excluded list. The excluded list may be a default list of names and/or may be user-specified. By checking an excluded name list (e.g., with an exact or fuzzy match), searches that may retrieve a large number of documents not logically related to the current document (e.g., a search for "Jones" or a lender name) may be avoided.

The current record may include one or more values for records in the first subset associated with recorded documents referenced by the recorded document associated with the current record. One or more searches 306 are performed to retrieve the records from the first subset referenced by the current record. One or more searches 308 may also be performed for records in the first subset referencing the current record (i.e., records for other recorded documents that reference the current record's recorded document).

A parcel identification value may be associated with the current record. By way of example, the parcel identification value may be a number assigned to the property by the government entity. The parcel identification value associated with the current record may be used to search 310 for additional records in the first subset associated with the same parcel identification.

One or more location values may also be associated with the current record. By way of example, the location values may include a subdivision value, a block value, a lot value, a tract value, survey values, and other location values. In some embodiments, the current record may contain a reference to a record in a second subset of data with the location values. One or more location values may be used to search 312 for records in the first subset associated with the location values.

It should be appreciated that the searches described above may be executed in any order. Additionally, searches other than those illustrated in FIG. 3 may additionally or alternately be performed. By way of example, searches may be performed to retrieve records matching (or fuzzily matching) an address value associated with the current record. Alt should also be appreciated that in alternate embodiments, a different combination of searches than those illustrated above may be performed. Additional searches may be added and/or some of the illustrated searches may not be performed.

Referring back to FIGS. 2 and 3, an exemplary embodiment for retrieving records for a title examination can be described. A starting record associated with a recorded document is obtained 202. This document may be the last conveyance, a mortgage, or other type of recorded document. Although it is not required, it is preferred that the starting record include location information, address information, parcel identification, and either all the names of the current owners or the names of a previous owner. The starting record may be obtained from a user or other source. A first attribute associated with the record, such as a current owner name is selected. One or more searches 304 can be performed to retrieve records for recorded documents associated with the same name. Records found with the search are added 208 to the result set. If there are additional names associated with the starting record (such as a previous conveyer or an additional owner), these names may also be searched 304 to find documents associated with these additional names.

If the recorded document associated with the starting record references other documents, records for these referenced documents are also retrieved 306 and added to the result set. Additional searches 308 may be performed to retrieve records associated with documents referring to the starting document. Searches 310 may also be performed to retrieve documents having the same parcel identification as the starting document. Searches 312 may also be performed for documents with the same or similar location information.

After all attributes of interest associated with the starting record have been searched, one of the records in the result set may be selected 216 to be processed. The selected record may be processed similar to the starting record. Each remaining record in the result set may also be processed. Logic 100 may keep track of all the ways in which a record was retrieved (e.g., name search for name obtained from record X, location search for location obtained from record Y, referenced by record D, etc.). Logic 100 may also keep track of the searches that are performed in order to avoid duplicating searches. At the conclusion of the searching, most (if not all) of the records associated with documents needed to perform a title examination will be contained in the result set.

Figure 4:
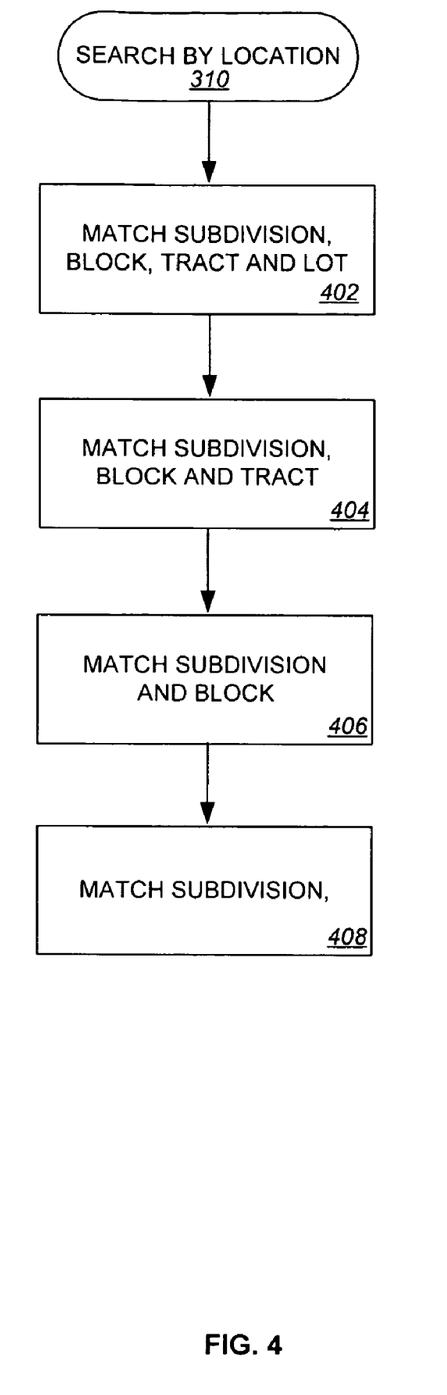
FIG. 4 is a flow diagram of an exemplary method that may be used by the method of FIG. 3 to perform a search using a location.

FIG. 4 illustrates an exemplary method that may be used by the method of FIG. 3 to search 312 by location. The location values for the current record may include a subdivision value, block value, a tract value, and a lot value. One or more searches may be performed for records in the first set matching 402 all four values. Fuzzy logic searches may be used for those values that are text based (e.g., the subdivision value). By way of example, the current record may refer to a record in a second set of data that contains all four values. Records in the first subset associated with the same record in the second set of data may be retrieved and added 208 to the result set. As a second example, records may be retrieved from a second set of data, such as a location table, that match all four values. Records from the first subset of data associated with the records retrieved from the second subset of data are added 208 to the result set.

One or more searches may also be performed for records in the first subset associated with location values that match 404 the subdivision value, the block value, and a tract value, but have an empty value for the lot. Similarly, one or more searches 406 may be performed for records in the first subset that match the subdivision and block values, but have empty values for the tract and lot. Finally, searches may be performed 408 for records in the first subset that match the subdivision value, but have empty block, tract, and lot values. It should be appreciated that these searched may retrieve records that are recorded at a higher hierarchical level than the particular property under examination, but are applicable to the property. For example, these searches may retrieve covenants applicable to the property that were recorded for a subdivision. As a second example, these searches may provide for the retrieval of earlier records related to the same location before the location was subdivided.

In alternate embodiments, searches for location may be performed differently than described with reference to FIG. 4. As one example, the location values may include sectional survey data (range, township, section, quarter, section). Records from the first subset may be retrieved that are associated with equivalent location for the current record and intersecting locations. Other types of location searches may also be performed. Alternately, or additionally, sectional survey data and/or metes/bounds searches may be used in various combinations with the subdivision/block/tract/lot searches described above.

Figure 5:
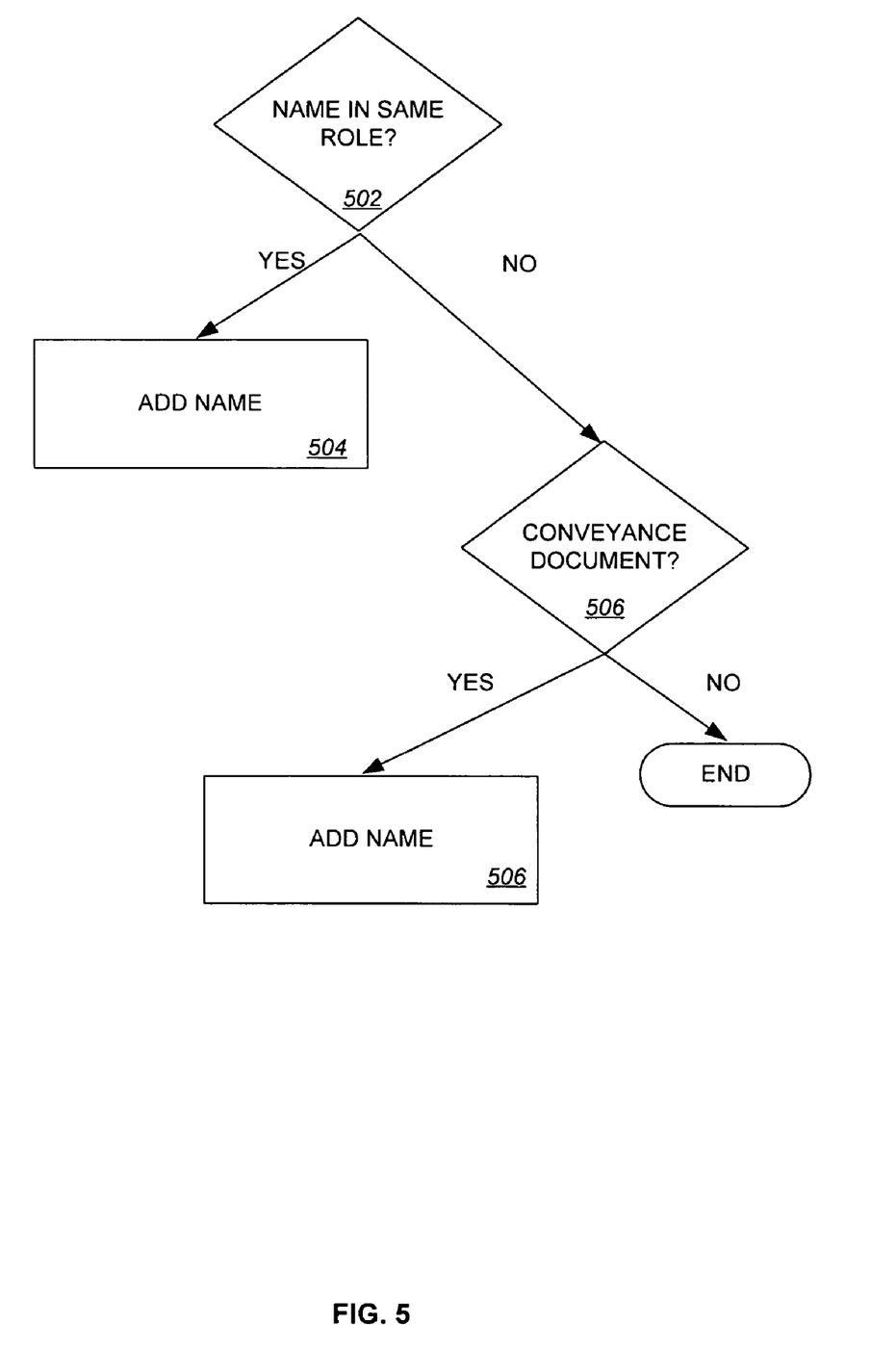
FIG. 5 is a flow diagram of an exemplary method that may be used to add names to be searched.

FIG. 5 illustrates an exemplary embodiment of a method that may be used to determine if a name associated with the current record should be added to the attribute values to search. A determination 502 is made as to whether the name value associated with the current record has the same role as a name that was previously searched. For example, a name that was previously searched may have a role of owner. An additional name may also be associated with the current record in the role of owner. This may occur when a property is jointly owned by two or more parties. If the name is in the same role, the name value is added 304 to the list of name values to be searched.

Otherwise, a determination 506 is made as to whether the current record is associated with a conveyance document (e.g., a transfer of land). If it is, names associated with other roles are added 508 to the list of names to be searched 304. Otherwise, the method ends. The method may be repeated for each additional name associated with the current record. In alternate embodiments, different criteria may be used to determine whether a name associated with a current record should be used in one or more searches.

During the search process, records may be added to the result set that do not logically relate to the starting record or other starting criteria. For instance, during a search for records related to a recorded document, various searches may retrieve documents not related to the property under examination or otherwise relevant to a title examination. Thus, a verification may be performed on one or more of the records in the result set using at least one verification criteria. Records that do not satisfy the criteria for verification may be removed from the result set. After the records have been verified, the remaining records in the result set may be displayed to a user or processed further by logic 100.

Figure 6:
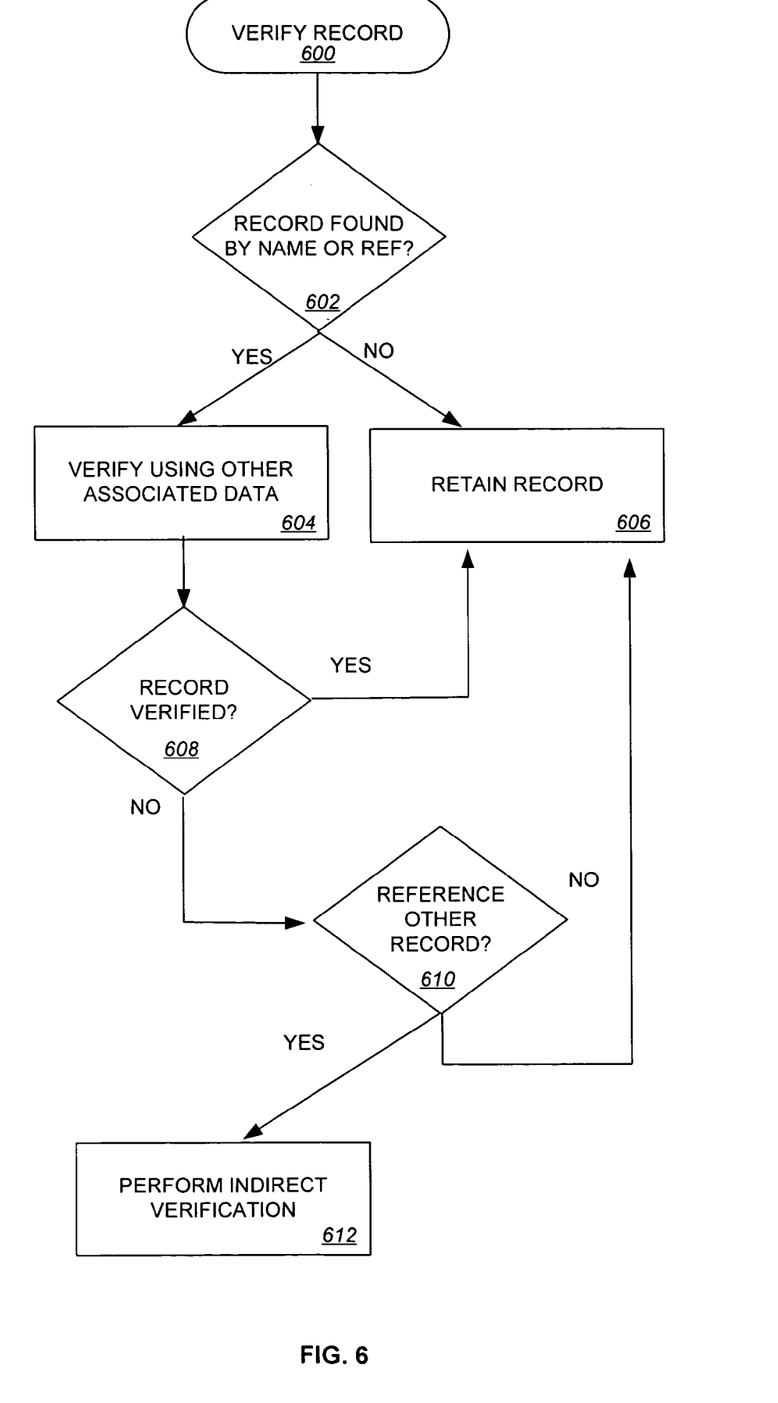
FIG. 6 is a flow diagram of an exemplary method that may be used to verify one or more documents in the result set of FIG. 3.

One exemplary method that may be used to verify 600 records is illustrated in FIG. 6. This method may be used in embodiments for which records for a title examination are retrieved. Records that are not logically related to the starting record are removed from the result set. For example, this method may be used to remove records obtained during a name search that apply to a different property than the one being examined.

A determination 602 is made as to whether the record was found by a name or reference search. These are the types of searches that are most likely to introduce records not related to the starting record. If a different type of search was used to obtain the record, the record is retained 606. Otherwise, as will be described in further detail with reference to FIG. 7, an attempt is made to verify 604 the record using and other data associated with the record. If the record is verified, it is retained 606.

Records that do not verify using location and other data values may be verified indirectly with a record referenced by the current record. Thus, a determination is made as to whether the record references another record 610. If it does, an attempt may be made to perform an indirect verification 612 using information obtained from the referenced document. This will be described in further detail below with reference to FIG. 8. If the record does not reference another document, the record is retained 606 on the assumption that it may be relevant. It should be appreciated that in alternate embodiments, the record may be removed from the result set if it cannot be verified.

In some embodiments, the manner in which the record was retrieved may affect the decision on whether to keep or discard the record from the result set. Additionally or alternately, in some embodiments, the decision on whether to keep or discard a record may depend on the type of document that the record is associated with. For example, in one embodiment, if the record was found by a name search, the location data does not match or fuzzily match, and there exists no other verification information, the document type may be examined to determine whether to keep the document. By way of example, lines and encumbrances may be retained while other types of records are removed. The determination of whether to keep or retain the document may also include evaluating whether the document was found by an original name search or a back chain search.

Figure 7:
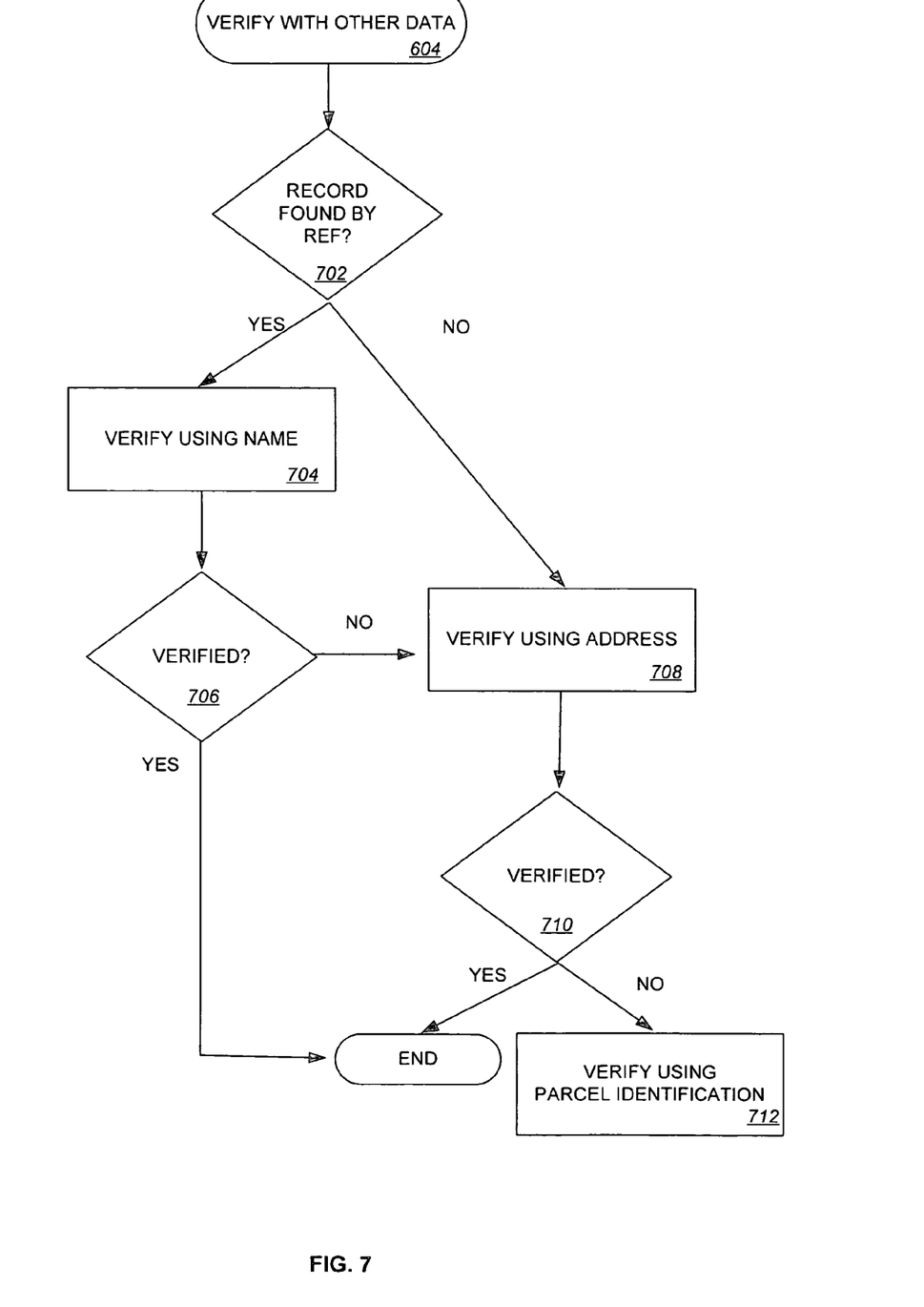
FIG. 7 is a flow diagram of an exemplary method that may be used by the method of FIG. 6 to verify documents retrieved by location.

FIG. 7 illustrates an exemplary method that may be used by the method of FIG. 6 to verify a record using other data. A determination 702 is made as to whether the record was found based on a search for records associated with documents referenced by the current record. If the record was found based on a reference search, the record may be verified 704 using one or more names associated with the current record. The name(s) associated with the current record are compared to names previously used to search for records and/or one or more names received as inputs to the search process. By way of example, a user may have entered inputs to be used for verifying records using user interface 120. Alternately, the inputs may have been obtained from the starting record. The comparison may be an exact or fuzzy comparison.

If the record is verified 706 using a name, the method ends and returns to FIG. 6 where the record is retained 606 in the result set. Otherwise, if the record is not verified using a name (either because there were no name values associated with the record or the comparison indicates the values are different), an attempt may be made to verify 708 the record using an address associated with the current record. The address may be compared to an address been obtained as an input to the search process (either from a user input or data obtained from the starting record). If an address associated with the current record matches the input address, the record is verified 710 and the method returns to 606.

If a verification of the record cannot be made using an address, an attempt may be made to verify the record using a parcel identification value associated with the record. If the record has a parcel identification value associated with it that matches an input parcel identification value, the method returns to 606. Otherwise, the method returns to 612.

It should be appreciated that in alternate embodiments, the order in which a verification is selected may vary. For example, an attempt may be made to verify the record with a parcel identification before an address. In some embodiments, a record may be need to be verified with more than one criteria before it is verified. Thus, a record may fail verification if two or more criteria (e.g., name and address) do not match. Alternately, a record may fail verification if any one of the criteria is not satisfied. As an example, if the record fails to be verified 704 with a name, the record may be removed from the result set. Finally, it should be appreciated that criteria other than the criteria illustrated in FIG. 7 may also be used to verify the record belongs in the result set.

Figure 8:
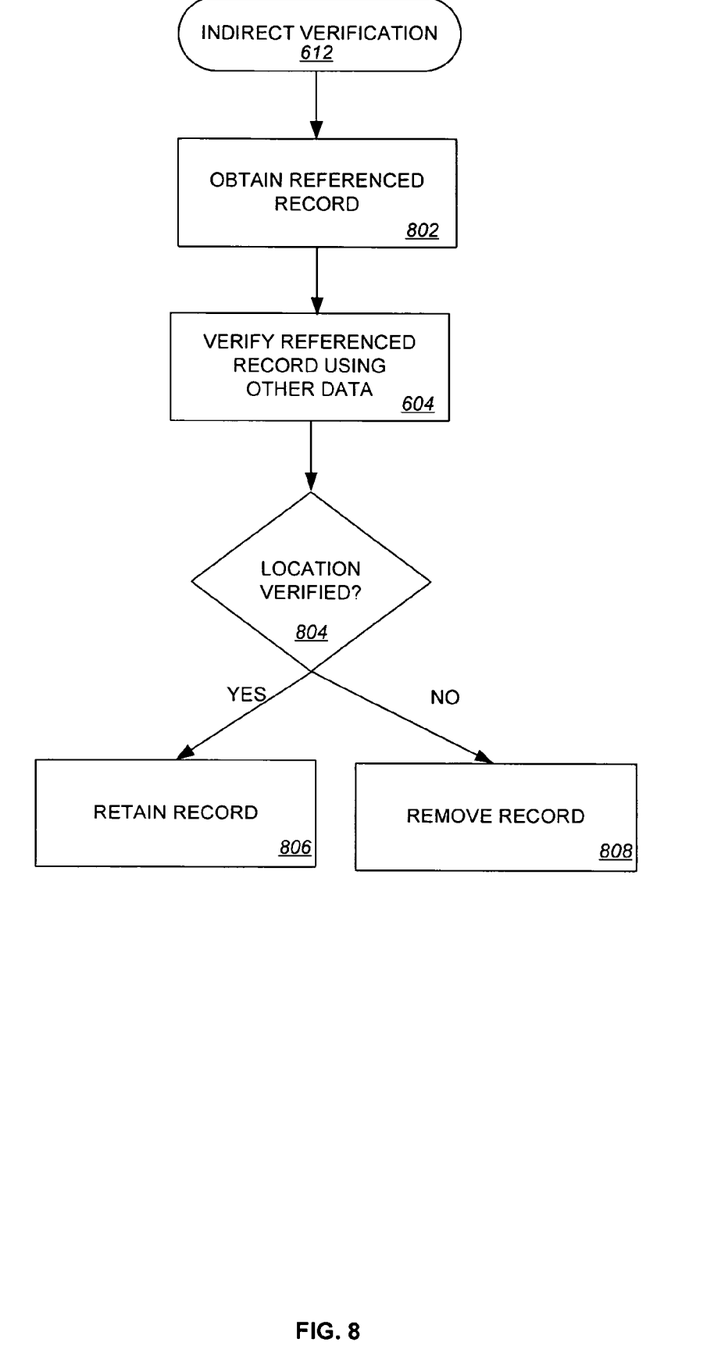
FIG. 8 is a flow diagram of an exemplary method that may be used by the method of FIG. 6 to perform an indirect verification.

FIG. 8 illustrates an exemplary method that may be used by the method of FIG. 6 to perform an indirect verification of a record. The method begins by obtaining 802 a record referenced by the current record. The reference record is associated with a recorded document referenced by the current record's recorded document. Information associated with the referenced document is used to attempt to verify 604 the referenced document as described in FIG. 6.

If the referenced document is verified 804, the record is retained 808 in the result set. Otherwise, the record has failed all attempts at verification and it is removed 810 from the result set. It should be appreciated that in alternate embodiments, the record may be removed from the result set if it fails any one of the criteria described in FIGS. 6 and 7. Alternately, the record may need to satisfy a subset of the criteria in order to be verified. Records failing to satisfy the criteria required for verification are removed from the result set.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of conducting a search of recorded property records, comprising:

from a user input that identifies a parcel, selecting a starting record from among a plurality of recorded property records comprised by a data set, each recorded property record having one or more attributes associated therewith, and wherein each attribute has a value;

using a location attribute value from the starting record to search the data set to identify first additional records from the data set, each first additional record having the location attribute value;

adding the first additional records to a result set of records;

using a name attribute value of each record of the result set, searching the data set to identify second additional records, each second additional record having the name attribute value;

adding the second additional records to the result set;

thereafter, using at least one additional attribute value of each record of the result set, searching the data set to identify third additional records, each third additional record having the additional attribute value;

adding the third additional records to the result set;

removing a specific record from the result set if an address value of the specific record differs from an address value of the starting record; and outputting at least a portion of the result set.

2. The method of claim 1, wherein using a location attribute value from the starting record to search the data set to identify first additional records comprises executing a fuzzy logic search for the location attribute value.

3. The method of claim 1, further comprising marking the starting record with an indication that the starting document has been processed.

4. The method of claim 1, wherein using a location attribute value from the starting record to search the data set to identify first additional records comprises executing a search for an exact match of the location attribute value.

5. The method of claim 1, wherein values of location category attributes comprise subdivision values, lots values, block values, or tract values.

6. The method of claim 1, further comprising, before using a name attribute value of each record of the result set to search the data set to identify second additional records having the name attribute value, determining that the name attribute value does not at least approximately match a name contained in an excluded name list.

7. The method of claim 1, wherein location attribute values comprise sections, townships, and ranges, and wherein using a location attribute value from the starting record to search the data set to identify first additional records from the data set comprises executing a search for additional records in the data set having a specific section value, a specific township value, or a specific range value.

8. The method of claim 1, further comprising, removing a specific record from the result set if a parcel identification value of the record differs from a parcel identification value of the starting record.

9. A property record search system, comprising:

a data set comprising a plurality of recorded property records, each recorded property record having one or more attributes associated therewith, wherein the attributes are selected from a group of attribute categories consisting of names, locations, referenced documents, parcel identification, and address, and wherein each attribute has a value;

a processor comprising instructions to:

from a user input that identifies a parcel, selecting a starting record comprised by the data set;

use a location first attribute value from the starting record to search the data set to identify first additional records from the data set, each first additional record having the location attribute value;

add the first additional records to a result set of records;

use a name attribute value of each record of the result set to search the data set to identify second additional records, each second additional record having the name attribute value; and add the second additional records to the result sets;

thereafter, use at least one additional attribute value of each record of the result set to search the data set to identify third additional records, each third additional record having the additional attribute value;

add the third additional records to the result set; and remove a specific record from the result set if an address value of the specific record differs from an address value of the starting record.

10. The system of claim 9, wherein the instructions to use a location attribute value from the starting record to search the data set to identify first additional records comprise instructions to execute a fuzzy logic search for the location attribute value.

11. The system of claim 9, wherein the processor further comprises instructions to mark the starting record with an indication that the starting document has been processed.

12. The system of claim 9, wherein the instructions to use a location attribute value from the starting record to search the data set to identify first additional records comprise instructions to execute a search for an exact match of the location attribute value.

13. The system of claim 9, wherein the processor further comprises instructions to, before using a name attribute value of each record of the result set to search the data set to identify second additional records having the name attribute value, determine that the name attribute value does not at least approximately match a name contained in an excluded name list.

14. The system of claim 9, wherein the processor further comprises instructions to remove a specific record from the result set if a parcel identification value of the record differs from a parcel identification value of the starting record.

15. The system of claim 9, further comprising an input configured to receive the user-indication of a starting record.

16. The system of claim 9, further comprising means for outputting at least a portion of the result set to a user.

17. A method of conducting a search of recorded property records, comprising:

identifying a starting record from among a plurality of recorded property records comprised by a data set, each recorded property record having one or more attributes associated therewith, wherein the attributes are selected from a group of attribute categories consisting of names, locations, referenced documents, parcel identification, and address, and wherein each attribute has a value;

using a first attribute value from the starting record to search the data set to identify first additional records from the data set that relate to the first attribute value;

adding the first additional records to a result set of records;

thereafter, using each attribute value of each record of the result set, searching the data set to identify subsequent additional records;

adding the subsequent additional records to the result set;

removing records from the result set if an address value of the record differs from an address value of the starting record; and outputting at least a portion of the result set.

* * * * *

UNITED STATES PATENT AND TRADEMARK OFFICE
CERTIFICATE OF CORRECTION

PATENT NO. : 7,324,998 B2  Page 1 of 1
APPLICATION NO. : 10/804468
DATED : January 29, 2008
INVENTOR(S) : Timothy E. Beres et al.

It is certified that error appears in the above-identified patent and that said Letters Patent is hereby corrected as shown below:

Column 1, line 9, after "of" insert --each of which are herein--

Column 1, line 19, after "60/554,514" insert --entitled--

Column 4, line 57, delete "contact" and insert --contain--

Column 5, line 1, delete "andlor" and insert --and/or--

Column 8, line 6, delete "Alt" and insert --It--

Column 13, line 1, delete "first"

Column 13, line 10, delete "sets" and insert --set--

Signed and Sealed this

Seventeenth Day of June, 2008

JON W. DUDAS
*Director of the United States Patent and Trademark Office*